United States Patent [19]

Baldock et al.

[11] Patent Number: 5,282,881
[45] Date of Patent: Feb. 1, 1994

[54] SMELTING OF METALLURGICAL WASTE MATERIALS CONTAINING IRON COMPOUNDS AND TOXIC ELEMENTS

[75] Inventors: Brian R. Baldock, Skye; John M. Floyd, Upper Beaconsfield; Brian W. Lightfoot, Ermerald; Kenneth R. Robilliard, Upwey, all of Australia

[73] Assignee: Ausmelt Pty. Ltd., Australia

[21] Appl. No.: 835,998

[22] PCT Filed: Aug. 24, 1989

[86] PCT No.: PCT/AU90/00365

§ 371 Date: Feb. 21, 1992

§ 102(e) Date: Feb. 21, 1992

[87] PCT Pub. No.: WO91/02824

PCT Pub. Date: Mar. 7, 1991

[30] Foreign Application Priority Data

Aug. 24, 1989 [AU] Australia .................. PJ5948

[51] Int. Cl.⁵ ............................................. C21B 11/08
[52] U.S. Cl. ............................................. 75/500
[58] Field of Search ................................. 75/500

[56] References Cited

U.S. PATENT DOCUMENTS 3,734,717  5/1973  Seglin ................... 75/500
5,069,715  12/1991  Reid ..................... 75/500

FOREIGN PATENT DOCUMENTS 128494   2/1977  Australia .
164653  10/1980  Australia .
 90060   7/1982  Australia .
 41929   8/1985  Australia .

OTHER PUBLICATIONS

Soviet Inventions Illustrated, Week 8429 (Aug 29, 1984) p. 11, SU A1 1054436, UST-Kamengorskij Revolyutsii Svintsovotsinkovyj Kombinatim V.I. Lenina.

Primary Examiner—Peter D. Rosenberg
Attorney, Agent, or Firm—Watts, Hoffmann, Fisher & Heinke Co.

[57] ABSTRACT

A process for smelting metallurgical waste material containing at least one iron compound, at lest one heavy metal, and at least one toxic element. The waste material and a reductant are introduced into a furnace. Heat is applied to the waste material and to the reductant to form a melt under reducing conditions whereby volatilization of the heavy metal occurs and a matte or speiss is formed in which the toxic element is stabilized. Fuel and an oxidizing gas are introduced into the melt by submerged injection to create a submerged oxidizing region. The melt is circulated to the submerged oxidizing region and is oxidized causing volatilization of the toxic element stabilized in the matte or speiss.

25 Claims, 1 Drawing Sheet

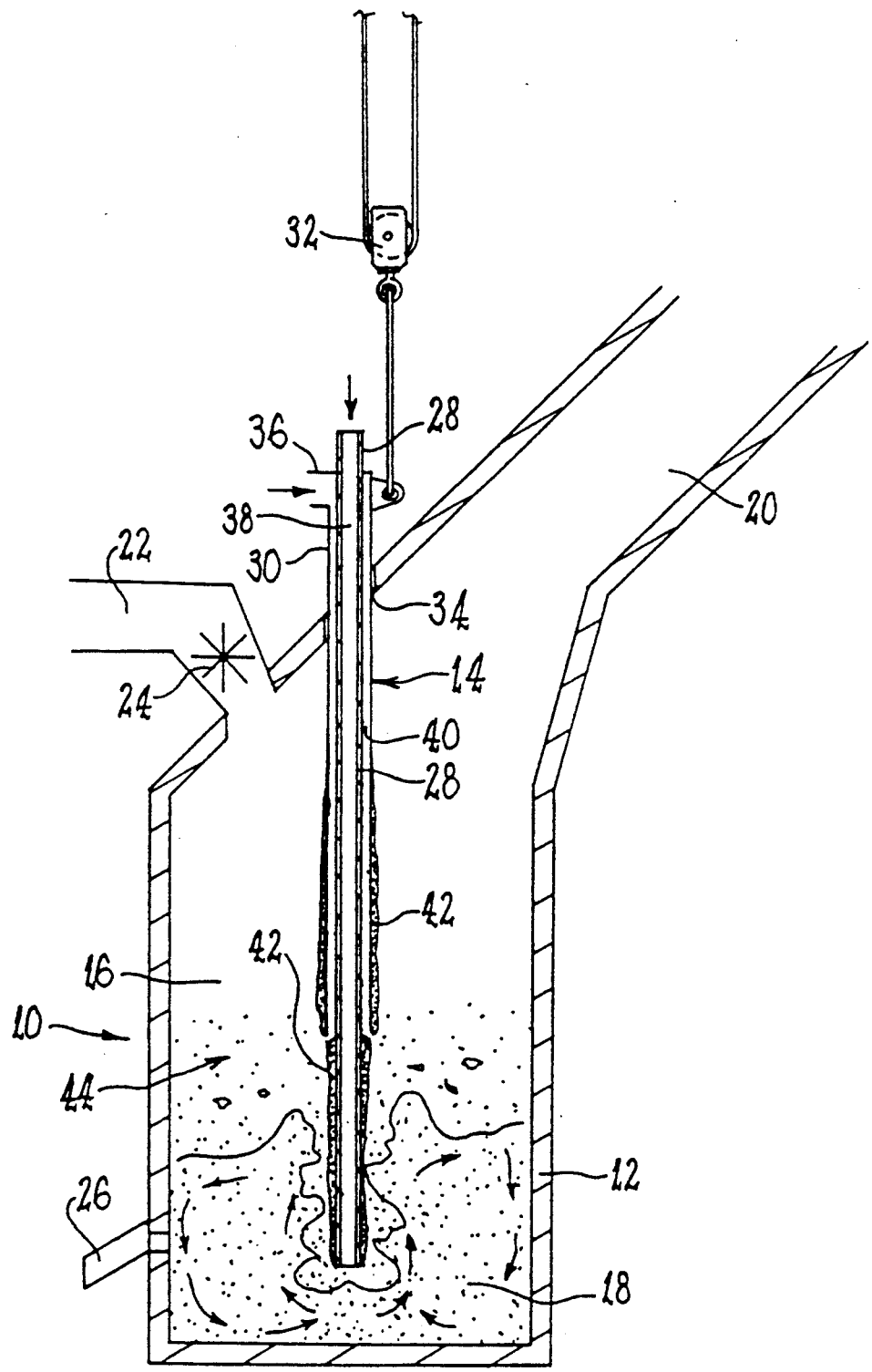

SMELTING OF METALLURGICAL WASTE MATERIALS CONTAINING IRON COMPOUNDS AND TOXIC ELEMENTS

This invention provides a method for smelting of metallurgical waste materials containing iron compounds and associated toxic elements. The invention enables recovery of metal values from such materials and the production of environmentally acceptable slag product.

One form of waste material for which the present invention is suitable is the final residue from leaching calcine from an electrolytic zinc process. The residue may contain at least one of jarosite, goethite and other iron compounds. It also contains significant concentrations of heavy metals such as toxic elements zinc and lead, as well as toxic elements such as arsenic and cadmium, and valuable metals such as silver. The waste cannot be disposed of as land fill or stored in open dumps because the toxic elements are unacceptably high and are leachable under weathering conditions, resulting in contaminated ground water. For this reason most plants store the waste in ponds sealed with plastics linings, or other sealing means. With time, the sealing means can break down, resulting in leakage of solutions and contamination of ground waters.

Other forms of waste material able to be smelted in accordance with the present invention include clinker from zinc kiln roasting operations, and iron and steel plant flue dusts. These waste materials also contain iron compounds, as well as toxic elements such as detailed above. Like the electrolytic zinc process leach residue, the toxic elements of these other waste materials are such that they can not be disposed of because of environmental risk.

To maintain a clean environment there is a requirement for a process which avoids the need for the storage of these and similar waste materials and which can be used in an on-going operation to produce an environmentally acceptable product. Leaching processes have been developed to remove the toxic elements, but these are expensive to build and operate and do not produce a completely satisfactory final product.

Smelting processes have been tried over a period of time for these waste materials, but these have been costly to build and to operate because of the perceived need for two-stage processing. Both theoretically and practically it has been found that a single-stage processing of the waste materials in conventional furnace systems cannot remove all of the toxic components to the low-levels needed for compliance with safe environmental disposal of the final product. Smelting the materials under strongly reducing conditions can remove the zinc, lead and cadmium by volatilization reactions to sufficiently low levels, but the arsenic is not removed to low enough levels. This is because under strongly reducing conditions arsenic is stabilized in the form of speiss (iron arsenide containing base metals such as copper) or in solution in matte (iron sulphide containing base metals such as copper). This occurs not only with smelting under reducing conditions, but also with plasma arc furnace operations which necessarily are reducing. Smelting the materials under weakly reducing, neutral or oxidizing conditions removes arsenic and cadmium but does not remove zinc and lead to low enough levels.

Thus previously developed processes have been based on two stages of smelting. The first stage is an oxidizing stage, removing the arsenic together with cadmium, some zinc and most lead to produce a lead-rich fume and a slag which contains most of the zinc and much of the lead in the feed material. This stage, as generally proposed, has to be carried out in a suspension smelting furnace, such as a cyclone or Outokumpu flash reactor. However it can also be carried out in bath smelting reactors using tuyere injection from below or lance injection from above of fuel, air and/or oxygen, such as conventional zinc fuming furnaces and in reactors using a top submerged lance injection system.

The second stage involves the transfer of the slag from the oxidizing smelting system into a second furnace, or a different zone in the same furnace, which operates under strongly reducing conditions to remove most of the zinc and lead remaining in the slag by volatilization reactions to produce an environmentally acceptable slag and a valuable fume product. The slag is tapped and solidified by conventional means.

In each stage the fume is removed from the gas stream by known procedures and then further processed for recovery of zinc, lead and silver. The slag can either be sold for use in cement manufacture or steel making, or can be disposed of as environmentally stable land fill.

We have found that a single-stage process for smelting of suitable waste material, such as detailed above, can be used to produce a valuable fume and an environmentally-suitable slag. It has been found that, contrary to previous experience and theoretical predictions, the feeding of electrolytic zinc leach residues and similar materials such as those containing or comprising iron compounds such as jarosite, into a submerged combustion bath smelting or similar furnace under conditions which are overall strongly reducing, can enable arsenic as well as zinc, lead, antimony and cadmium to be fumed at rates sufficiently high to produce an environmentally acceptable slag without the need for further processing. The key to this surprising discovery is the need to operate under submerged combustion conditions in such a way that there is established in the melt at least one combustion region at which oxidation occurs, whilst reducing conditions prevail in the melt so as to provide strongly reducing conditions at least at the surface of the melt. As a consequence, speiss or matte produced in the melt under the reducing conditions is able to be re-oxidized in the combustion region or regions, causing volatilization of the arsenic as the metal, or the oxide.

In general terms, waste materials to which the present invention relates are those containing:

(a) iron compounds;

(b) at least one heavy metal which necessitates smelting under strongly reducing conditions for its removal by volatilization to an acceptably low level; and (c) at least one second toxic element which is stabilized in a matte or speiss phase formed from the iron compound under those conditions and which necessitates smelting under mildly reducing, neutral or oxidizing conditions for its volatilization to an acceptably low level.

The iron compounds are iron oxides, such as haematite and goethite, mixed oxides such as ferrites of which zinc ferrite is the most typical example, and iron sulphates such as jarosites. The heavy metals necessitating strongly reducing conditions include zinc and lead, while arsenic, bismuth and antimony are the most typical examples of toxic elements which are stabilized in a matte or speiss and necessitate other than strongly reducing conditions. Other metal elements which may be present include cobalt, copper, gallium, germanium, gold, indium, nickel and silver. Lead, of course, is a toxic element but, for the purposes of the present invention, it is considered simply as a heavy metal. Cadmium also may be present and also is both a heavy metal and a toxic element and, while cadmium does not necessitate conditions as strongly reducing as for zinc and lead, it is for convenience categorised as a heavy metal along with lead and zinc.

In one form, the invention provided a process for smelting of such waste material, wherein the waste material and reductant is fed to a smelting furnace and subjected to a single stage smelting operation therein by submerged injection of fuel and an oxygen containing gas. The injection is conducted such that at least one submerged combustion region is generated in a melt formed in the furnace at which region oxidation of the melt occurs, whilst reducing conditions exist in the melt to provide strongly reducing at least at the surface of the melt. The reducing conditions are established so as to cause volatilization of the at least one heavy metal, and formation of a matte or speiss from the at least one iron compound in which the at least one toxic element is taken up and stabilised. The injection produces circulation of the melt in the furnace such that matte or speiss produced in the reducing region circulates to, and is oxidized in, the combustion region to cause volatilization of the at least one second toxic element. The smelting preferably proceeds to a stage at which a resultant slag produced is low in both the at least one heavy metal and the at least one toxic element.

As indicated, the overall reducing conditions are suitable for volatilization of heavy metals comprising zinc, lead and cadmium, although minor portions of these also can be volatilized at the combustion region. The oxidizing conditions in the combustion region prevent the retention of toxic elements such as arsenic and antimony in stable compounds or solutions in matte or speiss formed by the iron compounds under the reducing conditions, and thus ensure their effective volatilization in the combustion region.

This invention is well suited to operation in a top submerged lance reactor However the use of other reactors, such as bottom blown tuyere injection systems, also is possible.

The process of the invention can also include a brief blow-down or purging period during which injection is continued without feed of waste material. This enables the last levels of impurities to be volatilized before tapping slag as environmentally acceptable product.

The process of the invention can be conducted in a batch-wise operation. However, it preferably is conducted on a continuous or semi-continuous basis, with principal variants being as follows:

(A) Continuous smelting during progressive charging of waste material to the furnace and injection to maintain the at least one combustion region in the melt, with batch-wise or continuous tapping of slag. This has benefits where $SO_2$ liberated from the melt is to be recovered from toxic element values of volatilized flue gases for sulphuric acid production.

(B) Continuous smelting during progressive charging of waste material and injection to maintain the combustion region, until the furnace is full, followed by a blow-down or purging period in which smelting and injection are continued without further charging of waste material. Tapping of slag then precedes continuous smelting in a next smelting cycle.

(C) Operation as in (A), but with the tapped slag being charged to a second furnace for further batch or continuous smelting therein.

In each of these variants, most of the heavy metal values and substantially all of the toxic element values are volatilized in the continuous smelting period. However, a blow-down or purge period is preferred as it enables residual levels of heavy metal values, principally lead and/or zinc, to be further reduced. Variant (C) also enables such further reduction, principally of lead and/or zinc, and it can be of benefit where the feed of waste material has a relatively high initial content of those heavy metal values, and provides an overall energy saving. While the previously developed process discussed above involves two stages, it is to be noted that variant (C) is in marked contrast to that process. The previous process necessitates two stages, the first being an oxidizing stage and the second being a reducing stage, with these being conducted at different time intervals in one furnace, or in two furnaces, in order to achieve effectively separate volatilization of toxic element content by oxidation and heavy metal content by reduction. In contrast, variant (C), as with other variants of the present invention, enables substantially complete volatilization of the heavy metal and toxic element contents in a single stage, with recourse to a second stage in a further furnace being simply to further reduce the heavy metal content below an already substantially acceptable level achieved in the single stage. Also, in addition to the smelting in the single stage being under reducing conditions, except where oxidizing occurs at the at least one combustion region, smelting in the further furnace also typically is under reducing conditions.

The process of the invention can produce a metal phase, and this can be tapped from the furnace. The phase typically will comprise iron and copper in solution, with nickel also being able to be present in this, as well as other valuable metals such as silver and gold. Separation of the slag and metal phase may be effected by selective tapping of each from the furnace, or from a settling furnace to which they are charged. After separation, the metal phase can be processed for recovery of one or more of the metal values.

This invention enables a number of advantages to be obtained. It allows the continuous smelting of the waste material in a single furnace producing an environmentally acceptable slag and a valuable fume product. With operation of a single furnace, rather than two furnaces, the process is cheaper to build and cheaper to operate. Control of the process is simpler and easier to achieve because a single furnace can be used under substantially constant operating conditions. Because slag does not need to be transferred from one furnace into another, the process can more easily be made environmentally acceptable. The process is less hazardous because the difficult transfer of an oxidized slag from one furnace into another is able to be avoided. The process also avoids the potential hazard of foaming of slag resulting from a body of oxidized slag being subjected to strongly reducing conditions. The reductant requirements for the process are less than for the two stage oxidation-reduction process, because the formation and reduction of large quantities of magnetite in the slag is avoided.

With close to stoichiometric combustion of the fuel in the submerged combustion zone or zones, use of fuel is more efficient than is possible with lower oxygen levels, giving an overall lower fuel requirement for the process. Finally, the injection can be by a smaller gas volume in a single stream, making the control of emissions from the plant more easily achieved.

The waste material is fed to the furnace in a particulate form. The waste material may be fully dried or, as with a filter cake, it may be moist. Most conveniently it is fed in a pelletised form, preferably free of excessive fines or of oversize material. A particle size range of from 3 mm to 25 mm is preferred, such as from 3 mm to 15 mm. The waste material can be fed to the furnace through the or at least one lance or tuyere used for injection of oxygen containing gas and fuel. However, that material can be fed independently of such lance or tuyere, whether by a separate lance or tuyere or otherwise.

The oxygen containing gas preferably is air. However, it may comprise oxygen enriched air, oxygen, or a mixture of oxygen and an inert gas. The reductant may comprise particulate carbonaceous material, such as coal, while the fuel can be of any suitable material such as oil, natural gas or fine coal. In some instances, the one material can serve as the reductant and fuel. The reductant may be injected, in which case it can be injected together with or separately from the oxygen containing gas and fuel. Oxidizing conditions prevail at the combustion zone when the fuel:oxygen injection ratio is close to stoichiometric because oxygen comes into contact with the melt and oxidises it before combustion can take place to completion. Furthermore $CO_2$ and $H_2O$ generated by combustion reactions will oxidise the slag melt components such as FeO as well as any speiss or matte present. Preferably there is a stoichiometry of combustion in the range of from 85 to 100% in terms of the oxygen required for complete combustion of the fuel, although a slight stoichiometric excess of oxygen can be tolerated. Where the stoichiometry in that range of 85 to 100%, it is preferred that this be under conditions which cause partial oxidation of the slag in the combustion region.

As at least a partial source of carbon as reductant, carbon-containing ash material can be used. The silica content of such ash is of benefit in acting as a flux and providing a fluid slag. However, this benefit can be derived from separate addition of silica in a suitable form, such as where the other carbonaceous reductant is used.

Addition of reductant most preferably is away from the combustion zone, in the or a reducing zone. However, as indicated, a reductant in particulate or lump form can be added at or adjacent the combustion zone, such as via the lance or tuyere through which the oxygen containing gas and fuel is injected and, in tending to float, the reductant will move away from the combustion zone. Where coal to provide both fuel and reductant is added via the lance or tuyere, the coal will be present in a mixture of particle sizes; the finer particles burning rapidly and serving as fuel, with the coarser particles being dispersed in the melt under the injection action to act as reductant away from the combustion region.

The process of the invention can be operated over a relatively wide temperature range, such as from 1150° C. to 1500° C. However, a relatively high temperature, such as from 1350° C. to 1500° C., most preferably from 1350° C. to 1450° C., is preferred to achieve a suitable fuming rate.

The accompanying FIG. 1 illustrates operation in accordance with the present invention, utilizing a top submerged lancing furnace. However, as detailed herein, a furnace having a bottom-blown tuyere injection system also can be used.

In FIG. 1, there is shown a furnace 10 defining a smelting chamber 12 to which waste material to be smelted, and also reductant and flux, is able to be charged via rotatable feed controller 14 at inlet 16. Furnace 10 also has a flue gas off-take 18 and a top submerged lance 20 projecting so that its lower end is within the smelting zone of chamber 12.

With a melt 22 established in chamber 12, such as from a preceding smelting operation, waste material, reductant and (if required) flux is charged continuously via inlet 16. Simultaneously fuel, and oxygen-containing gas such as air, is injected into the melt via lance 20. At the outlet of lance 20, there is established a combustion region 24 in which the fuel is burnt, but in which oxidation of the melt occurs. The addition of coal reductant is such that strongly reducing conditions prevail at least at the surface of the melt 22, other than at the combustion region 24. The injection action provided by lance 20 is such that circulation of the melt is established, as depicted by arrows. Thus, the melt 22 passes between region 24 and surrounding regions, and its constituents are subjected to oxidation at region 24 and reduction away from that region.

At least at the surface of the melt, the reducing conditions result in volatilization of the heavy metal Content of the melt, such as zinc, lead and cadmium. Those conditions also result in iron compounds of the waste material feed forming a matte if sufficient sulphur is present in the feed material, or a speiss if the sulphur content of that feed is limited. Toxic elements, principally arsenic, but also antimony in the case of a speiss being formed, are stabilized by being taken up by the matte or speiss such that their volatilization from the melt under the reducing conditions is substantially precluded. However, on circulation of the melt to the combustion region 24, the toxic element content is liberated under the oxidizing conditions at that region, and volatilized. The matte or speiss also can contain some zinc, lead, silver, gold, copper, nickel and cobalt, and at least a portion of the lead and zinc content thereof can be volatilized from the melt at region 24.

The volatilized toxic elements exit from the furnace with flue gases discharged from off-take 18. Those elements may be present in the flue gases as the metal vapour or, by establishing oxidizing conditions in chamber 12 above the melt, they can be converted to the oxides. The toxic elements are separated from the flue gases for further processing, and recovery of metal values.

Furnace 10 also has an outlet 26, from which a slag product having an acceptable low level of toxic elements can be tapped periodically, or continuously. The slag product can be discarded or sold as an environmentally acceptable product.

As shown, lance 20 is provided with a protective slag layer 28 as is known in the art. Layer 28 typically is formed by splashing of slag under the jetting action of lance 20 as the latter is lowered to its required position.

EXAMPLE 435 kg of waste material, comprising a final residue from leaching calcine in an electrolytic zinc process, was smelted in a top submerged lancing furnace. The waste material was in pelletised form, containing a substantial proportion of jarosite and, overall by wt.%, 2.49% Zn, 6.27% Pb, 18.2% Fe, 4.18% $SiO_2$, 2.02% CaO, 160 ppm Ag, 2825 Ppm As, 1260 ppm Cu, 13.5% S and 38% water. The waste material gas fed to the furnace at an averate rate of 87 kg/hr. for 5 hours. Together with the pelletised waste material, 264 kg of a waste ash material from power plant operations, and having 0.98% Zn, 3.34% Pb, 6.2% Fe, 27.6% $SiO_2$, 2.92% CaO, 190 ppm Ag, 562 ppm As, 1.41% S, 32.3% C and 14.7% water, was fed into the furnace over that 5 hour period. The lance was fired with natural gas, air and oxygen at an overall stoichiometry of 90% combustion, and at an oxygen enrichment of 28%. After the 5 hours of operation a sample of slag was taken and this assayed 0.8% Zn, 0.5% Pb and 30 ppm As. Lump coal was also added to the waste material and ashes at a rate of 10 kg/hr. for a further period of 1 hour, and a dip sample of the slag at the end of that period assayed 0.55% Zn, 0.8% Pb and 30 ppm As. The variation of zinc, lead and arsenic with time were trending downwards and even lower levels of Zn, Pb and As are possible with optimisation of feeding rates and operating conditions. The feed was stopped while continuing to inject natural gas and oxygen (as air) at a stoichiometry of 55%. After 20 minutes, the level of Zn, Pb and As in the slag had dropped to 0.12%, 0.0323% and <10 ppm respectively, demonstrating that a short non-feeding period before tapping will rapidly decrease the levels of impurities to much lower levels.

It will be appreciated that various alterations, modifications and/or additions may be introduced into the constructions and arrangements of parts previously described without departing from the spirit or ambit of the invention.

The claims defining the invention are as follows:

1. A process for smelting a metallurgical waste material in a furnace, said waste material containing: at least one iron compound, at least one heavy metal, and at least one toxic element, the at least one heavy metal including at least one of lead, zinc and cadmium and the at least one toxic element including at least one of arsenic, antimony and bismuth, to produce a slag product having a reduced content of the at least one toxic element and a reduced content of the at least one heavy metal, the steps of said process comprising:
   a) introducing the waste material and a reductant into the furnace;
   b) applying heat to the waste material and a reductant to form a melt under reducing conditions whereby volatilization of the heavy metal occurs and whereby a matte or speiss is formed in which the toxic element is stabilized;
   c) introducing a fuel and an oxidizing gas into the melt by submerged injection so as to create at least one submerged oxidizing region in the melt; and,
   d) circulating the melt such that the matte or speiss circulates to said at least one submerged oxidizing region and is oxidized thereby causing volatilization of the toxic element stabilized in said matter or speiss.

2. A process as claimed in claim 1, wherein said heavy metal includes at least one of zinc and lead.

3. A process as claimed in claim 1, wherein said submerged injection of said fuel and said oxidizing gas is by means of at least one top submerged lance.

4. A process as claimed in claim 1, wherein said submerged injection of said fuel and said oxidizing gas is by means of a bottom-blown tuyere injection system.

5. A process as claimed in claim 1, wherein said smelting operation is continued for a first period of time during which said waste material is fed to said melt; the feeding of said waste material then being discontinued during a blow-down or purging period in which the level of said at least one heavy metal in the melt is reduced by continued said submerged injection of said fuel and said oxidizing gas.

6. A process according to claim 1, wherein said oxidizing gas has an oxygen content providing for from 85 to 100% complete combustion of the fuel.

7. A process according to claim 1, wherein said oxidizing gas is selected from at least one member of the class consisting of air, oxygen enriched air, oxygen, and a mixture of oxygen and an inert gas.

8. A process according to claim 1, wherein said fuel is selected from oil, natural gas and fine particulate coal.

9. A process according to any one of claim 1, wherein said reductant comprises particulate or lump carbonaceous material.

10. A process according to claim 9, wherein said reductant is selected from particulate coal and carbon-containing ash material.

11. A process according to claim 10, wherein said reductant is carbon-containing ash material having a silica content sufficient to act as a flux in providing a fluid slag.

12. A process according to claim 10, wherein silica is added to the furnace with said reductant to act as a flux in providing a fluid slag.

13. A process according to claim 1, wherein said reductant is added to the furnace, during said smelting operating, at a location spaced from said at least one combustion region.

14. A process according to claim 1, wherein said reductant is added to the furnace, during said smelting operation, at said at least one combustion region and is in a form enabling it to float away from said at least one combustion zone.

15. A process according to claim 14, wherein said reductant is added to the furnace by injection means used for said submerged injection of said fuel and said oxidizing gas.

16. A process according to claim 1, wherein smelting operation is conducted at a temperature of from 1150° C. to 1500° C.

17. A process according to claim 16, wherein said temperature is from 1350° C. to 1500° C.

18. A process according to claim 1, wherein the slag product is passed to a further furnace in which it is further smelted to produce a slag having a further reduced content of said at least one first toxic element.

19. A process according to claim 1, wherein the at least one iron compound of said waste material is from the group comprising iron oxides including goethite and haematite, mixed oxides including ferrites, sulphates including jarosite, and mixtures thereof.

20. A process according to claim 1, wherein said at least one heavy metal is from the group comprising zinc, lead, cadmium and mixtures thereof.

21. A process according to claim 1, wherein said at least one toxic element is from the group comprising arsenic and antimony.

22. A process according to claim 1, wherein said waste material includes a residue from leaching calcine from an electrolytic zinc process.

23. A process according to claim 1, wherein said waste material includes clinker from a zinc kiln roasting operation.

24. A process according to any one of claim 1, wherein said waste material includes iron or steel plant flue dust.

25. A process according to claim 1, wherein said waste material is pelletised prior to being fed to said furnace.

* * * * *